US012586286B2

(12) United States Patent
Alimo et al.

(10) Patent No.: US 12,586,286 B2
(45) Date of Patent: Mar. 24, 2026

(54) DIFFERENTIABLE REAL-TIME RADIANCE FIELD RENDERING FOR LARGE SCALE VIEW SYNTHESIS

(71) Applicant: OPAL AI Inc., Los Angeles, CA (US)

(72) Inventors: Shahrouz Ryan Alimo, Los Angeles, CA (US); Lorenzo Giusti, Rome (IT)

(73) Assignee: OPAL AI Inc., Los Angeles, CA (US)

( * ) Notice: Subject to any disclaimer, the term of this patent is extended or adjusted under 35 U.S.C. 154(b) by 121 days.

(21) Appl. No.: 18/492,720

(22) Filed: Oct. 23, 2023

(65) Prior Publication Data

US 2024/0135623 A1    Apr. 25, 2024
US 2024/0233236 A9    Jul. 11, 2024

Related U.S. Application Data

(60) Provisional application No. 63/418,216, filed on Oct. 21, 2022.

(51) Int. Cl.
| | |
|---|---|
| *G06T 17/00* | (2006.01) |
| *G06T 5/20* | (2006.01) |
| *G06T 5/40* | (2006.01) |
| *G06T 5/73* | (2024.01) |
| *G06T 7/00* | (2017.01) |
| *G06T 7/80* | (2017.01) |
| *G06T 15/00* | (2011.01) |

(52) U.S. Cl.
CPC ............... *G06T 15/00* (2013.01); *G06T 5/20* (2013.01); *G06T 5/40* (2013.01); *G06T 5/73*

(2024.01); *G06T 7/80* (2017.01); *G06T 7/97* (2017.01); *G06T 2207/20081* (2013.01)

(58) Field of Classification Search
CPC .............. G06T 5/40; G06T 7/80; G06T 17/00
USPC ........................................................ 345/419
See application file for complete search history.

(56) References Cited

U.S. PATENT DOCUMENTS

| | | | |
|---|---|---|---|
| 11,989,834 B1 * | 5/2024 | Agarwal ................. | G06T 19/20 |
| 2021/0044791 A1 * | 2/2021 | Zhang ........................ | G06T 7/97 |
| 2023/0360317 A1 * | 11/2023 | Wang ........................ | G06T 7/55 |
| 2024/0070972 A1 * | 2/2024 | Kosiorek ............... | G06N 3/045 |

OTHER PUBLICATIONS

Di et al., CAHVOR camera model and its photogrammetric conversion for planetary applications, Journal of Geophysical Research, vol. 109, E04004, doi:10.1029/2003JE002199, 2004, pp. 1-9 (Year: 2004).*

Mega-NeRF: Scalable Construction of Large-Scale NeRFs for Virtual Fly-Throughs, https://meganerf.cmusatyalab.org/, Haithem Turki, et al., Jun. 2022, 3 pages.

(Continued)

*Primary Examiner* — Samantha (Yuehan) Wang

(74) *Attorney, Agent, or Firm* — Young Basile Hanlon & MacFarlane, P.C.

(57) ABSTRACT

A method that includes obtaining images of an environment that are captured by one or more image capture devices, determining intrinsic parameters and extrinsic parameters of the one or more image capture devices that are associated with each of the images, creating a differentiable radiance field associated with the environment, and generating a three-dimensional representation of the environment. The three-dimensional representation contains one or more portions of the environment uncaptured in the images.

20 Claims, 8 Drawing Sheets

(56)     References Cited

OTHER PUBLICATIONS

Waymo, Block-NeRF Scalable Large Scene Neural View Synthesis, https://waymo.com/research/block-nerf/, Matthew Tancik, et al., retrieved from internet Nov. 9, 2023, 8 pages.

Colmap, https://colmap.github.io/, retrieved from internet Nov. 9, 2023, 2 pages.

Luma AI, https://lumalabs.ai/, retrieved from internet Nov. 9, 2023, 6 pages.

IEEE Xplore, Sequential Convex Programming Revisited, https://ieeexplore.ieee.org/document/9683728, Mohsen Kheirandishfard et al., Feb. 1, 2022, 4 pages.

Multi-Agent Motion Planning using Deep Learning for Space Applications, https://arxiv.org/ftp/arxiv/papers/2010/2010.07935.pdf, Kyongsik Yun et al., retrieved from internet Nov. 9, 2023, 13 pages.

3D Gaussian Splatting for Real-Time Radiance Field Rendering, https://repo-sam.inria.fr/fungraph/3d-gaussian-splatting/, Bernhard Kerbl et al., Jul. 2023, 7 pages.

NeRF Representing Scenes as Neural Radiance Fields for View Synthesis, https://www.matthewtancik.com/nerf, Ben Mildenhall et al., 2020, 10 pages.

* cited by examiner

610 — EXTRACT FIRST IMAGE SET

620 — EXTRACT SECOND IMAGE SET

630 — DETERMINE COORDINATE LOCATIONS AND VIEWING DIRECTIONS OF IMAGE SETS

640 — DETERMINE COMMONALITY BETWEEN IMAGE SETS

650 — DETERMINE RELATIVE POSITIONS OF IMAGE SETS

660 — CREATE SHARED IMAGE SET

600

DIFFERENTIABLE REAL-TIME RADIANCE FIELD RENDERING FOR LARGE SCALE VIEW SYNTHESIS

CROSS-REFERENCE TO RELATED APPLICATION

This application claims priority to and the benefit of U.S. Provisional Patent Application No. 63/418,216, filed on Oct. 21, 2022, the entire contents of which are hereby incorporated by reference.

TECHNICAL FIELD

This disclosure relates to radiance field rendering, and more particularly, to differentiable techniques, such as neural radiance fields (NeRFs) and 3D Gaussian Splatting, employed to reconstruct spaces or objects.

BACKGROUND

Three-dimensional reconstruction of scenes or objects can be used for various purposes. For example, three-dimensionally reconstructed scenes or objects can provide information about an overall layout and perspective of a scene or object. Additionally, three-dimensional reconstruction may provide individuals with the ability to further analyze and review scenes or objects that are inaccessible to or not easily visible by the individuals. For example, three-dimensional reconstruction may be used to recreate the environment of a remote place, such as a faraway planet surface found during space exploration or a difficult to reach location on Earth (e.g., a mountain range, uninhabited regions, etc.) or complex structures in subterranean environments.

Due to a remote environment often being challenging or expensive to visit in person, review and analysis may often be done remotely based on images captured of the remote environment. These images may be used to generate a three-dimensional reconstruction of the remote environment, which may often result in an inaccurate or incomplete reconstruction of the desired environment. For example, the images of the environment may often be incomplete and/or lack various viewpoints of the environment. Additionally, the three-dimensional reconstruction may not accurately determine (e.g., convey) density and/or texture of surfaces and materials within the environment, thereby further hindering the accuracy of the reconstructed environment. It is therefore desirable to provide a solution that generates a three-dimensional reconstruction of an environment more accurately where reconstruction of spaces (e.g., scenes or objects) may have complex lighting effects and/or surface details that may be difficult to represent using filtering-based methods (e.g., photogrammetry).

SUMMARY

In one aspect of the present disclosure, a method is disclosed. The method includes: obtaining images of an environment that are captured by one or more image capture devices; determining intrinsic parameters and extrinsic parameters of the one or more image capture devices that are associated with each of the images; creating a differentiable radiance field associated with the environment based upon the images, the intrinsic parameters, and the extrinsic parameters; and generating, based upon the differentiable radiance field, a three-dimensional representation of the environment.

The three-dimensional representation contains one or more portions of the environment uncaptured in the images.

In certain configurations, the method may further include prior to determining the intrinsic parameters and the extrinsic parameters of the one or more image capture devices, filtering the images based on one or more filters to create a filtered image set. The one or more filters may include at least one of the following filters: a file dimension filter, an image shape filter, a duplicate image filter, a grayscale filter, a color histogram filter, or a blur detection filter.

In certain configurations, the method may further include determining neural graphics primitives of the environment based upon the images. Creating the differentiable radiance field may be based upon the neural graphics primitives, the intrinsic parameters, and the extrinsic parameters.

In certain configurations, the extrinsic parameters may include spatial location coordinates and a viewing direction of the one or more image capture devices associated with each of the images.

In certain configurations, the images of the environment captured by the one or more image capture devices may be two-dimensional images. The images of the environment may be captured by two or more image capture devices. At least one of the intrinsic parameters or the extrinsic parameters may be different between the two or more image capture devices.

In certain configurations, the intrinsic parameters and the extrinsic parameters may be initially represented by a CAHVOR model or a pinhole camera model for each of the images. The intrinsic parameters and the extrinsic parameters may be initially represented by the CAHVOR model. Additionally, the method may further include prior to creating the differentiable radiance field, converting the representation of the intrinsic parameters and the extrinsic parameters from the CAHVOR model to the pinhole camera model.

In certain configurations, the method may further include determining a quality of the three-dimensional representation compared to the environment and responsive to the quality determined, adjusting one or more hyperparameters of the differentiable radiance field created. The quality may be determined by determining a peak signal-to-noise ratio between the environment and the three-dimensional representation.

In certain configurations, the method may further include determining an uncertainty of the three-dimensional representation with respect to the one or more portions of the environment uncaptured in the images and generating, based upon the determined uncertainty, an uncertainty map. The uncertainty map may be a visual representation of geometric and texture uncertainties with respect to the one or more portions of the environment uncaptured in the images. Additionally, the uncertainty map may be generated based on a statistical method and the differentiable radiance field may be a neural radiance field (NeRF) or a 3D Gaussian Splatting.

In another aspect of the present disclosure, an apparatus is disclosed that includes a non-transitory memory and a processor configured to execute instructions stored in the non-transitory memory. The processor may be configured to executed the instructions to: obtain images of an environment that are captured by one or more image capture devices; determine intrinsic parameters and extrinsic parameters of the one or more image capture devices that are associated with each of the images; create a differentiable radiance field associated with the environment based upon the images, the intrinsic parameters, and the extrinsic parameters; and generate, based upon the differentiable radiance field, a three-dimensional representation of the environment. Additionally, the three-dimensional representation contains one or more portions of the environment uncaptured in the images.

In certain configurations the images of the environment may be captured by a first image capture device and a second image capture device. At least one of the intrinsic parameters or the extrinsic parameters may be different between the first image capture device and the second image capture device. Additionally, the images may include a first image set that contains images of the environment captured by the first image capture device and a second image set that contains images of the environment captured by the second image capture device. The instructions may further include instructions to determine a commonality between at least one of the images of the first image set and at least one of the images of the second image set and based upon the commonality determined, determine a relative position of the first image capture device with respect to the second image capture device for each of the images of the first image set and the second image set. After determining the relative position of the first image capture device with respect to the second image capture device for each of the images of the first image set and the second image set, the instructions may further include instructions to combine the first image set together with the second image set to create a shared image set using the relative position determined. The three-dimensional representation of the environment may be created based upon the shared image set.

In another aspect of the present disclosure, a system is disclosed that includes a device having a non-transitory memory that stores computer-executable instructions and a processor configured to access the non-transitory memory and execute the computer-executable instructions. The process is configured to execute the computer-executable instructions to: obtain images of an environment that are captured by one or more image capture devices; determine intrinsic parameters and extrinsic parameters of the one or more image capture devices that are associated with each of the images; create a differentiable radiance field associated with the environment based upon the images, the intrinsic parameters, and the extrinsic parameters; and generate, based upon the differentiable radiance field, a three-dimensional representation of the environment. The three-dimensional representation contains one or more portions of the environment uncaptured in the images.

In certain configurations, the device may be one of a personal device or a cloud computer, and the computer-executable instructions are included in a downloadable software application. The downloadable software application may be executable to implement at least one of a simulation procedure, a learning procedure, a machine learning procedure, or a differentiable procedure.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
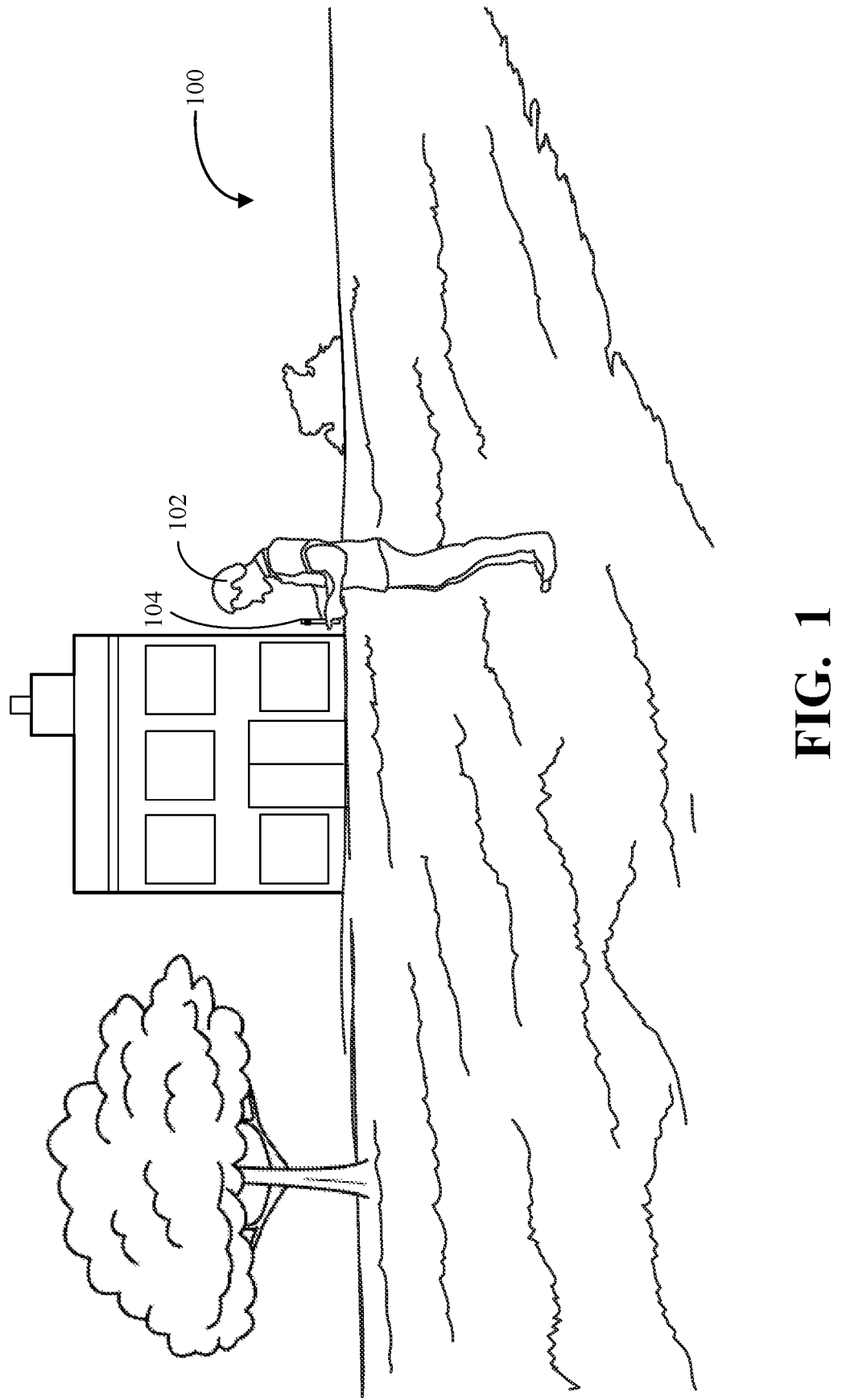
FIG. 1 illustrates an example image capture of an environment.

The present disclosure relates to generating three-dimensional scenes or objects. The three-dimensional scenes or objects generated may be based upon actual scenes or objects found in an environment. A three-dimensional scene or object generated may be representative of, and based upon, a real-world scene or object. That is, the three-dimensional scene or object may be a to-scale representation of the real-world scene or object. As a result, the generated three-dimensional scene or object may provide an accurate depiction of the real-world scene or object so that users (scientists, students, historians, etc.) of the three-dimensional scene or object may obtain information with respect to the real-world scene or object that may not be readily available or easily attainable (e.g., detectable or identifiable).

The generated three-dimensional scene or object may provide users with a depiction of the real-world scene or object in an augmented reality such that the users may view the generated three-dimensional scene or object in a manner similar to physically being at the real-world scene or object. For example, the three-dimensional scene or object generated may be representative of a location or object in the real-world that is not easily accessible (e.g., a mountain range, uninhabited regions, extraterrestrial planets, etc.) for physical study. As a result, the three-dimensional representation of a scene or object may facilitate further study and investigation without requiring travel to the physical scene or object that may be difficult or impossible to reach, may be cost prohibitive, may no longer exist (e.g., natural disaster damaging and/or destroying the scene or object), or a combination thereof.

The scenes referred to herein may be any geographic location, topography, or region that may have existed or presently exists in the real-world, whether on Earth or found in space. Similarly, an object as used herein may be, but is not limited to, an item, a building, an article, a structure, a device, or an animal. Thus, the three-dimensional generation as described herein is not limited to any particular scene or object.

Conventional generation of three-dimensional (3D) scenes or objects may often require precise data representative of the associated scene or object in the real world. For example, three-dimensional scenes or objects may be generated based upon images of the scene or object captured. The images may be two-dimensional (2D) still images or videos captured by an image capture device, such as a camera (e.g., an RGB camera or other camera, such as a depth camera (e.g., LiDAR or time of flight sensor), a thermal camera, radar, synthetic aperture radar, etc.) For example, the images may be 2D still images or a video may be captured, whereby the 2D still images may be extracted from the video. Additionally, the images or videos may be captured by one or more image capture device and/or one or more users. Frequently, generating 3D scenes or objects requires using images or videos captured by specifically tuned image capture devices. Similarly, generating 3D scenes or objects may often require that the images be captured in a specific pattern or layout and/or be captured from specific viewpoints. Additionally, the captured images may often have to represent every portion or surface of the scene or object to accurately generate the 3D representation. If at least some of these constraints are not met, generating a 3D scene or object may not be possible altogether, or a generated 3D scene or object may be an incomplete or an inaccurate representation of the real-world scene or object.

A 3D scene or object generated according to implementations of this disclosure address the aforementioned challenges by creating a differentiable radiance field, such as a neural radiance field (NeRF). The differentiable radiance field may be a 3D rendering technique that allows gradients of 3D objects or scenes to be calculated and propagated through a set of images that represent the 3D object or scene. The differentiable radiance field may be created to generate a 3D scene or object where reconstruction of the scene or object may be difficult due to complex lighting effects and/or surface details. Additionally, implementations of this disclosure result in the generation of accurate and substantially complete 3D representations of real-world scenes or objects. By way of example, the teachings herein may be used for generating visual effects (VFX) for a live-action shot in filmmaking or production, for indoor mapping or various structures (e.g., retail spaces, warehouses, etc.), for creating digital duplicates of construction or civil engineering projection, or for creating digital duplicates of existing structures, regions, or objects.

Additionally, a 3D representation of a real-world scene or object can be generated based upon incomplete information with respect to the real-world scene or object. That is, the 3D scene or object may be generated based upon partial views of the real-world scene or object, such as 2D images or videos captured of only a portion of the real-world scene or object. Additionally, portions of a real-world scene or object unrepresented by (e.g., not captured in) the captured images may be accurately generated (e.g., synthesized). Furthermore, a 3D scene or object may be generated based upon images obtained by two or more different image capture devices that include different intrinsic parameters and/or extrinsic parameters, as discussed in further detail below. That images are obtained by two or more different image capture devices includes that the images may be obtained at different points, from different points of view (e.g., perspectives), using different camera configurations, and the like.

Turning now to the figures, FIG. 1 illustrates an example of image capture of an environment 100. A user 102 may be physically present in the environment 100. The environment 100 may be an outdoor or an indoor environment. The environment 100 may encompass any topography, dimensions, or scale. For example, the environment 100 may be an outdoor area spanning in various directions, whereby the environment 100 may include varying topography. Additionally, the environment 100 may include or contain one or more natural objects (e.g., rocks, vegetation, trees, etc.), may include or contain one or more manufactured objects (e.g., buildings, structures, vehicles, etc.), or both.

The environment 100 itself and/or the objects therein may include or be composed of different materials. The materials may exhibit different properties that may be captured and identified during 3D generation of the environment 100, as described further below. For example, the ground shown in the environment 100 in FIG. 1 may exhibit different properties than a tree or bush located within the environment 100. Such properties of the various materials may include, but are not limited to, reflectance, density, texture, color, or a combination thereof.

To prepare for 3D generation of the environment 100, the user 102 may capture one or more images (e.g., 2D images and/or videos) using an image capture device 104. The image capture device 104 may be a personal electronic device carried by the user 102, such as a mobile phone, tablet, computer, or a combination thereof. As discussed in further detail below, the image capture device 104 may be connected, such as via a wireless network connection, to a system configured to generate the 3D representation of the environment 100. It should also be noted that additional image capture devices may be used to capture the images. For example, the image capture device 104 may be a first image capture device configured to capture a first set of images of the environment 100. A second image capture device may be configured to capture a second set of images of the environment 100. The first set of images and the second set of images may both be used for the 3D generation of the environment 100.

The user 102 may capture the one or more images using the image capture device 104 from various viewpoints and locations within or surrounding the environment 100. The user 102 need not capture every aspect or portion of the environment 100 to successfully generate a 3D representation of the environment 100. For example, the user 102 may capture images of one or more portions of the environment 100 using the image capture device 104 so that, during generation of the 3D representation of the environment 100, one or more novel portions of the environment 100 may be created and displayed even though such novel portions were not captured in the images.

In other examples, the images of an environment may not be captured by a human present in the environment. To illustrate, images may be captured by an autonomous vehicle that is configured to traverse the environment and capture images. For example, the autonomous vehicle may be one or more unmanned aerial vehicles that are configured to traverse the environment according to different flight plans and capture images of the environment. As another example, the autonomous vehicle may be one or more rovers (e.g., the Mars rovers) that are configured to transverse the surface of a planet (e.g., Mars) and capture images thereof.

Figure 2A:
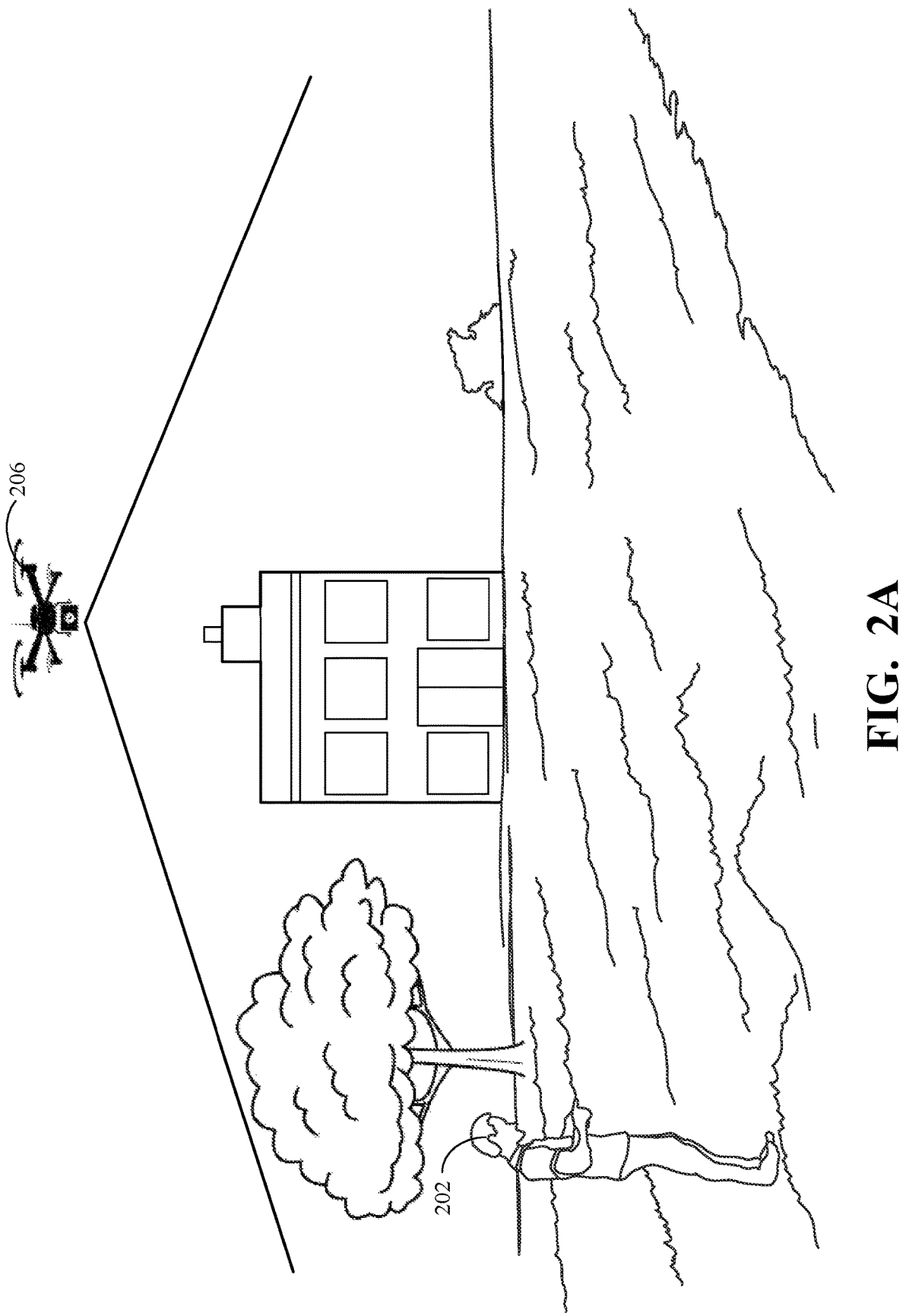
FIG. 2A illustrates an example 3D reconstruction of the environment of FIG. 1.
Figure 2B:
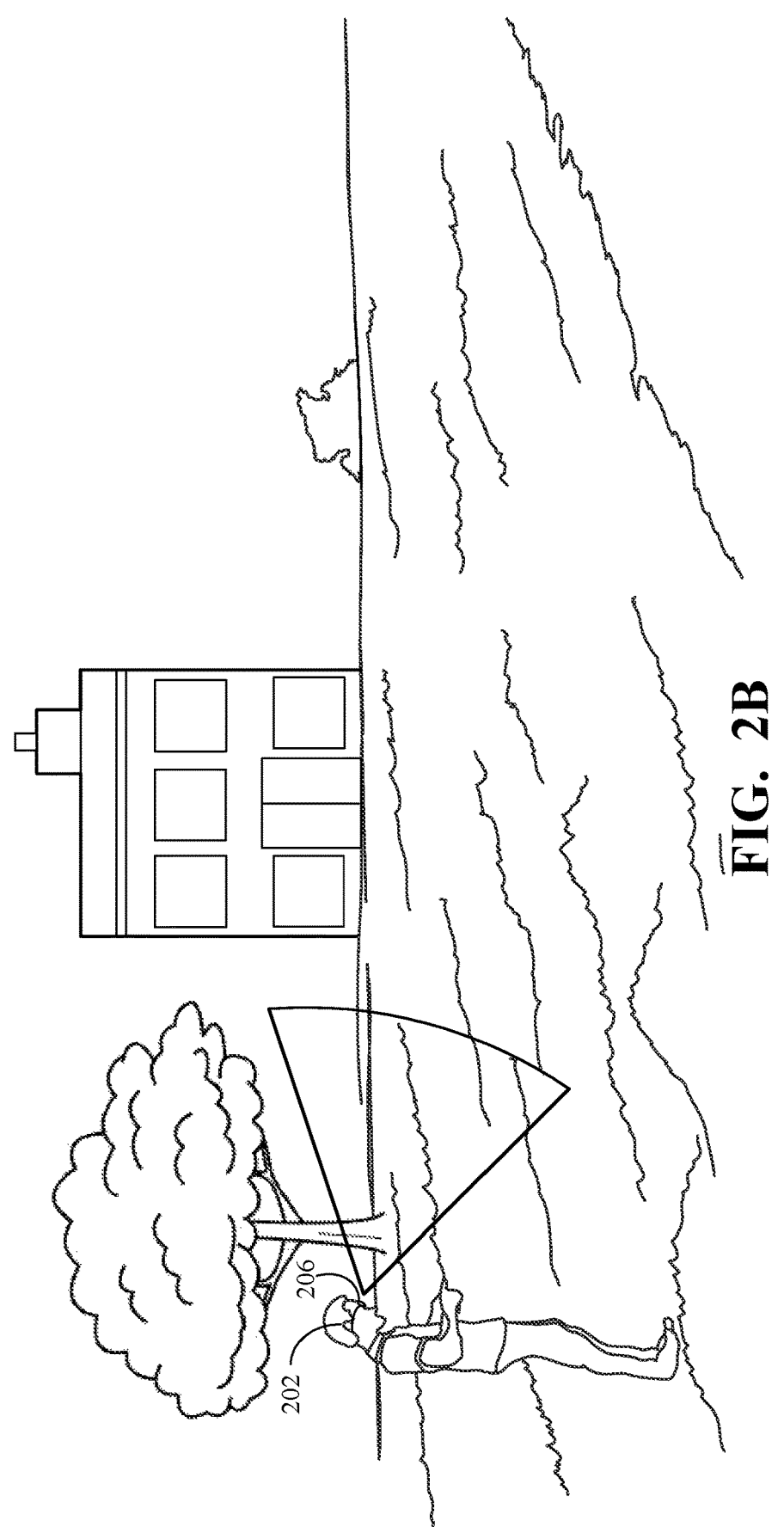
FIG. 2B illustrates an example 3D reconstruction of the environment of FIG. 1.

FIGS. 2A and 2B illustrate examples of a 3D reconstruction 200 of the environment 100 shown in FIG. 1. As discussed above, the user 102 of FIG. 1 may capture images using the image capture device 104. The images captured may then be used to generate the 3D reconstruction 200. A projector 204 may display the 3D reconstruction 200 for the user 202 to view. The user 202 may be the same or different from the user 102 of FIG. 1. As illustrated in FIGS. 2A and 2B, the 3D reconstruction 200 may be substantially to-scale when compared to the environment 100 such that the user 202 may navigate through the 3D reconstruction 200, either physically or virtually. The 3D reconstruction 200 may be provided such that the user 202 may navigate freely through the 3D reconstruction across the three-dimensions and allow for orientation with respect to the 3D reconstruction 200 using two different angles (e.g., using a spherical coordinate system).

The 3D reconstruction 200 may also be scaled to increase or decrease the overall dimensions of the 3D reconstruction 200 when compared to the environment 100. For example, in cases where the 3D reconstruction 200 is representative of a larger structure or area (e.g., a warehouse or even a surface of a planet), the 3D reconstruction 200 may be scaled down so that the user 202 may more effectively review the 3D reconstruction 200. More broadly, the user 202 may interact with the 3D reconstruction 200, via appropriate interaction (e.g., interface) devices, in a virtual reality or an augmented reality environment.

By way of example, FIG. 2A illustrates an example in which the 3D reconstruction 200 may be provided to the user 202 by a device 206, such as a camera or projector. The device 206 may be, or may be part of, a drone such that the 3D reconstruction 200 may be displayed on the ground to mirror the real-world scene or object. As a result, a user may physically navigate through the 3D reconstruction 200 to view the 3D reconstruction from various points-of-view. Alternatively, as shown in FIG. 2B, the user 202 may utilized a wearable device 208 to view the 3D reconstruction 200. The wearable device 208 may be glasses or a headset that facilitates the user 202 viewing the 3D reconstruction 200 in a virtual or augmented reality. As a result, the user 202 may navigate through the 3D reconstruction 200 in a similar manner to physically navigating the real-world scene or object. The wearable device 208 may also allow the user 202 to view the 3D reconstruction 200 from various points-of-view.

Figure 3A:
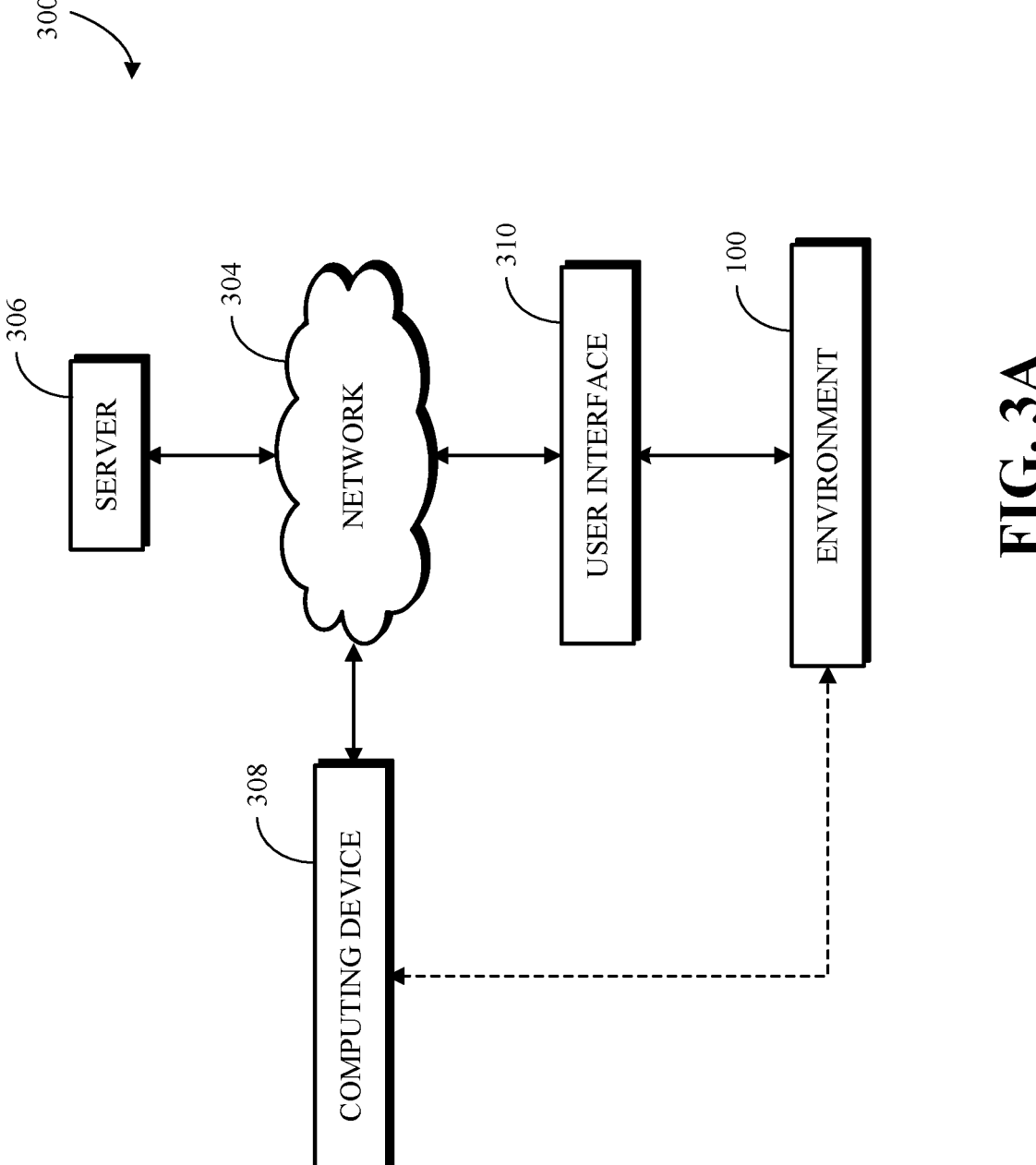
FIG. 3A is a first example of a diagram of a network configuration for a system that generates a differentiable radiance field of an environment.
Figure 3B:
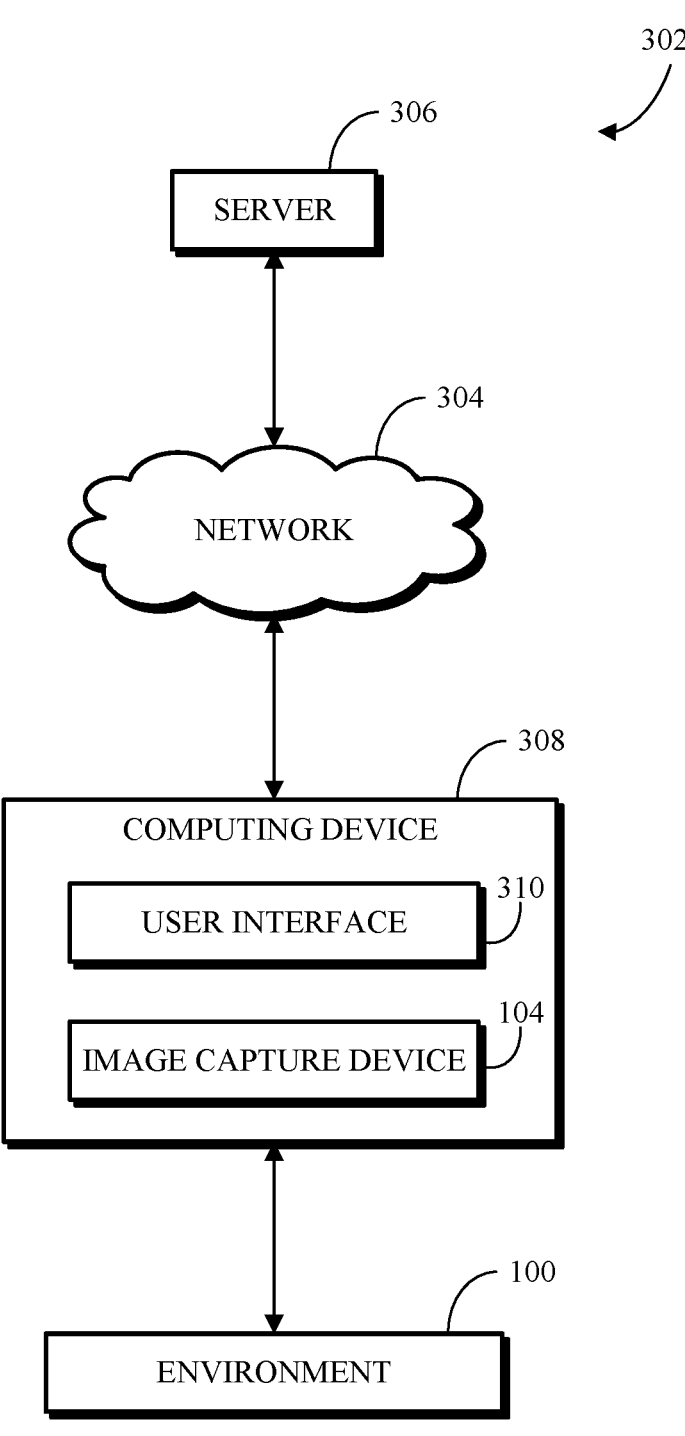
FIG. 3B is a second example of a diagram of a network configuration for a system that generates a differentiable radiance field of an environment.

FIG. 3A is a first example of a diagram of a network configuration for a system 300 configured to generate a neural radiance field (NeRF) of an environment, such as the environment 100. FIG. 3B is a second example of a diagram of a system 302 configured to generate a NeRF of an environment, such as the environment 100. That is, generating the 3D reconstruction 200 of the environment 100 may be implemented by the system 300 shown in FIG. 3A and/or the system 302 shown in FIG. 3B. While certain respective sets of components and arrangements thereof are described with respect to the systems 300, 302, the disclosure herein is not limited to or by such arrangements. Other system configurations and arrangements are possible and easily recognizable by a person skilled in the art.

The system 300 may employ (or be implemented as) a distributed architecture where various components of the system 300 are provided in various example devices and at various example locations. The example devices include a server 306, a computing device 308, and a user interface 310. The user interface 310 may be part of a personal device of a user, such as the user 102. For example, the user interface 310 may be or may include the image capture device 104, whereby the user 102 may capture images within the environment 100 using the image capture device 104 by interfacing with the user interface 310.

The system 302 may also employ an architecture similar to the system 300 described above. However, the system 302 may be substantially contained within the computing device 308 such that the image capture device 104 and the user interface 310 are contained within the computing device 308. For example, the computing device 308 may be a mobile phone or tablet that is configured to capture images of the environment 100 using the image capture device 104 (e.g., a camera of the mobile phone) and generate the 3D representation of the environment 100. In such a case, operation of the image capture device 104 and the computing device 308 (e.g., the mobile phone or tablet) may be accessed by the user 102 through the user interface 310.

Additionally, the 3D representation of the environment 100 may be generated using the one or more additional devices, such as the server 306.

In the system 302, the computing device 308 as described above may be any of various types of devices. A non-exhaustive list of devices may include a smartphone, a tablet computer, a phablet (phone plus tablet), a laptop computer, and a wearable device (a smartwatch, for example). The above example device may include the user interface 310 and the image capture device 104. For example, the device may include a camera integrated into the device. In the above scenario, the user 102 may swivel the computing device 308 that contains the image capture device 104 in various directions within the environment 100 to capture images of the environment 100 and any objects therein (e.g., structures, plants, vehicles, etc.).

The various devices shown in each of the systems 300, 302 are communicatively coupled to each other via a network 304. The network 304 may be any of various types of networks. For example, the network 304 may be a wide area network (WAN), a local area network (LAN), a public network, a Deep Space Network (DSN), and/or a private network, may include various types of communication links (a wired communication link, a wireless communication link, an optical communication link, etc.) and may support one or more of various types of communication protocols (Transmission Control Protocol (TCP), Internet Protocol (IP), Ethernet, Post Office Protocol (POP), Simple Mail Transfer Protocol (SMT), File Transfer Protocol (FTP), Hyper Text Transfer Protocol (HTTP), and Hyper Text Transfer Protocol Secure (HTTPS), etc.).

The computing device 308 may be any type of device. For example, the computing device 308 may be a personal computer, a desktop computer, a laptop computer, a mobile phone, or a tablet. In some implementations, the computing device 308 may be configured to operate as a server computer or a client computer that is separate from the server 306. More particularly, the computing device 308 (and a device which may contain the user interface 310 when the user interface is not contained within the computing device 308) may include a processor and a memory containing computer-executable instructions. The processor may be configured to access the memory and execute the computer-executable instructions to perform various operations in accordance with the present disclosure, such as various operations to generate a 3D representation (e.g., the 3D reconstruction 200 of FIG. 2) of an environment. In some implementations, the memory can be a non-transitory computer-readable storage medium. The term "non-transitory" excludes transitory signals and refers to media such as hard drives, flash memory, ROM, and other physical storage devices capable of storing executable instructions.

In some implementations, the computing device 308 may include, or may be in communication (e.g., communication through the network 304) with additional devices not shown in the systems 300, 302. For example, the systems 300, 302 may include one or more interaction devices that enable a user to interact with (e.g., view, navigate, etc.) a generated 3D representation of a scene or object. To illustrate, the systems 300, 302 may include a projection device, such as the projector 204 of FIG. 2. The computing device 308 may be perform various operations to generate the 3D reconstruction 200 of the environment 100 such that the generation of the 3D reconstruction 200 may be completed by the computing device 308 and communicated to at least one of the interaction devices (e.g., the projector 204), at which point the interaction device may present the 3D reconstruction 200 by the user 202 of FIG. 2.

The server 306 may be a cloud storage device used for storing various types of information such as for example, a database containing images of the environment 100. The computing device 308 and/or the user interface 310 may be configured to access the server 306 via the network 304 to retrieve information stored therein, such as the images of the environment 100. The server 306 may be configured to transmit the data (e.g., the images) from the server 306 to the computing device 308 and/or the user interface 310, may be configured to receive data (e.g., the images) from the computing device 308 and/or the user interface 310, or both. By way of example, the server 306 may contain a database containing images of the environment 100 that were captured and provided to the computing device 308 and/or the user interface 310 to generate a 3D representation of the environment 100. The images may be captured by the user 102 using the image capture device 104, whereby the images captured are stored on the server 306. Additionally, the images may be captured by a third party other than the user 102 using one or more additional image capture devices 104, whereby the images captured are stored on the server 306 for access by the computing device 308 and/or the user interface 310.

In some implementations, images of the environment 100 may be captured, either by a device within the systems 300, 302, or another device. If image capturing of the environment 100 is completed by another device, such as one or more external image capture devices that are not the image capture device 104, the images may be stored on the server 306 for retrieval by the computing device 308 and/or the user interface 310. The images captured may contain various types of information (scale, image capture angles, time camera settings, etc.), which can be provided in the form of image metadata. In certain cases, the image information may be provided in other formats. For example, if the images are stored within a database on the server 306, the database may also include other data associated with one or more of the captured images. The images associated with the one or more images may also be accessed by the computing device 308 and/or the user interface 310 (e.g., a personal device) and be utilized to generate the 3D representation of the environment 100.

Figure 4:
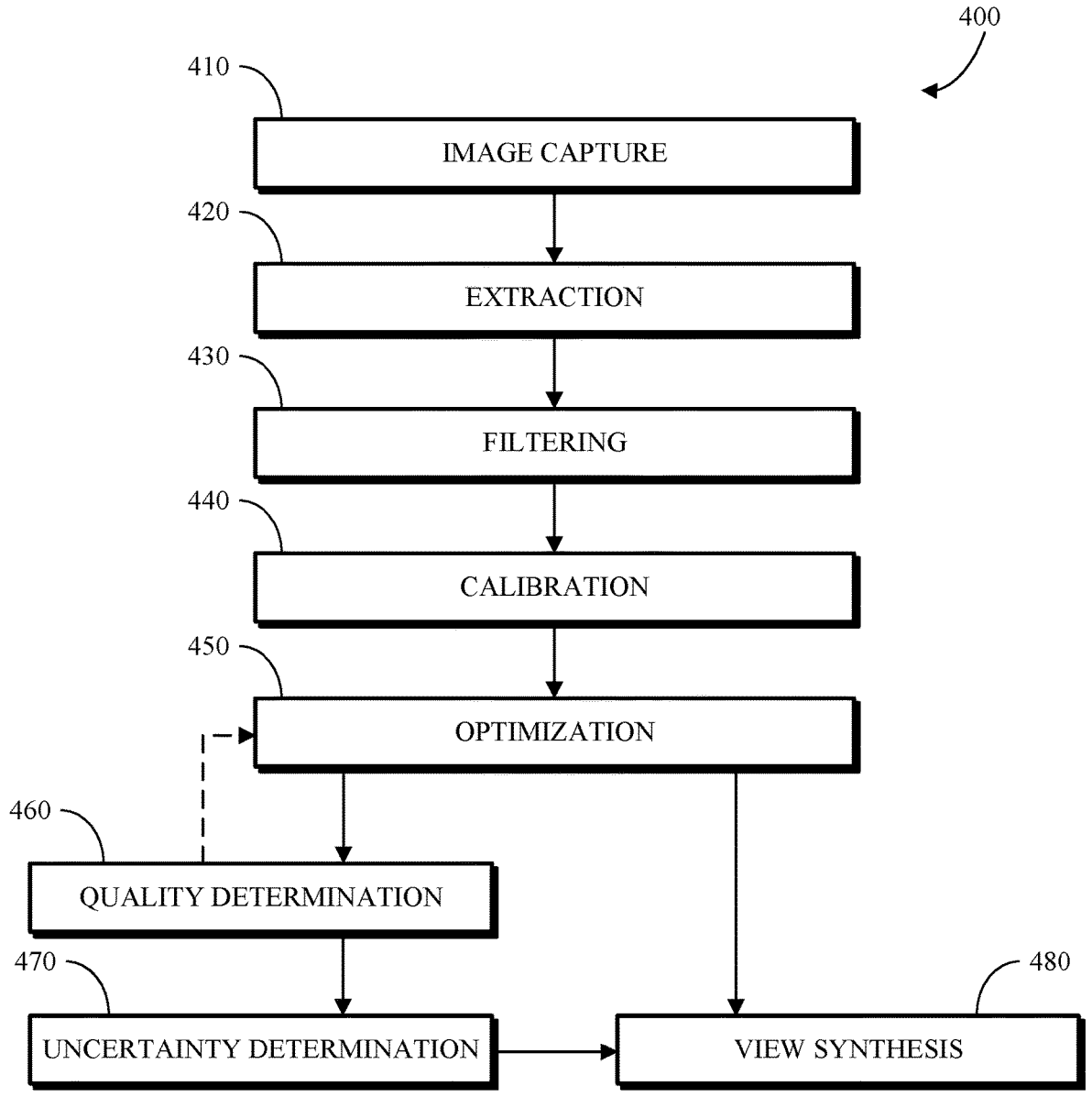
FIG. 4 is a flowchart of an example of a process for generating a differentiable radiance field of an environment.

FIG. 4 illustrates a flowchart of an example of a process 400 for generating a 3D representation of an object of scene, such as the 3D reconstruction 200 of the environment 100. The process 400 may be executed by use of the computing device 308. The process 400 may be performed, for example, by executing a machine-readable program or other computer-executable instructions, such as routines, instructions, programs, or other code that may be stored in a memory (e.g., one or more memories) of a computing device (e.g., one or more computing devices). The steps, or operations of the process 400 may be implemented directly in hardware firmware, software executed by hardware, circuitry, or a combination thereof. The process 400 may be executed by a processor (e.g., one or more processors) associated with or included in the computing device 308, a personal device containing the user interface 310, or a server device. The process 400 may be performed, for example, by a personal device or a cloud computer, and the computer-executable instructions may be included in a downloadable software application The downloadable software application may be executable to implement at least one of a simulation procedure, a learning procedure, an artificial intelligence procedure, or an augmented intelligence procedure to complete the process 400.

In an initial stage, images of an environment are captured at operation 410. The images may be captured by the image capture device 104 or one or more additional image capture device. For example, the image capture device 104 may be contained within a personal device of the user 102 such that the user 102 may interface with the image capture device 104 through the user interface 310 to capture the images. In certain situations, the images may have been captured by one or more image capture devices (e.g., cameras) at different times and stored for use by the process 400. For example, the images may be captured and stored, such as within a database on the server 306, for later access by the process 400. As such, the images are not limited to those captured by one image capture device. That is, the process 400 may also be implemented using images of (e.g., received from or captured by) more than one (e.g., two or more) image capture device.

The images may be extracted at operation 420. The images may be extracted directly from an image capture device, such as the image capture device 104 or the images may be extracted from one or more databases, such as a database stored on the server 306. Extraction of the images may require one or more operations, procedures, or steps. For example, the computing device 308 may execute a query or retrieval procedure to direct the extraction process to a particular set of images. That is, the query or retrieval procedure may be configured to only retrieve images pertaining to the desired scene or object and omit retrieval of irrelevant images.

Additionally, during extraction, any data associated with the images, such as various metrics associated with the images, may also be retrieved.

As mentioned above, the 3D reconstruction, such as the 3D reconstruction 200, may be generated based on or using a differentiable radiance field. The differentiable radiance field may be a neural network trained to generate the 3D reconstruction of an environment, such as the environment 100. The differentiable radiance field may be created based on the images captured at the operation 410 and/or additional data corresponding to the images captured. The neural network may be trained to take the images captured (i.e., a trained neural network) and create the differentiable radiance field for rendering the 3D reconstruction (e.g., the reconstruction 200) of the desired environment (e.g., the environment 100) by interpolating between the images captured to render one complete (e.g., substantially continuous) 3D reconstruction of the environment. In addition to rendering a 3D reconstruction that contains portions of the environment 100 captured in the images, the trained differentiable radiance field may synthesize one or more portions of the environment 100 that are not captured in the images. That is, the differentiable radiance field may generate novel portions of the environment not seen in the images of the environment.

The differentiable radiance field may be, for example, a neural radiance field (NeRF) or a 3D Gaussian Splatting. The differentiable radiance field may be created using one or more other techniques for 3D reconstruction and novel view synthesis. The differentiable radiance field may be created and trained in a centralized manner in which the data (e.g., images) is centralized in a single location and/or on a single device (e.g., the computing device 308) to train a central model. The differentiable radiance field may also be created and trained using a distributed learning framework in which the data may be centralized but training of the differentiable radiance field may be completed using different training nodes of a training model. Additionally, the differentiable radiance field may be a federated learning framework in which the data may be decentralized to train a central training model.

For purposes of the process 400 described herein, the differentiable radiance field may be referred to as a NeRF or a Gaussian Splatting. However, it is not intended to limit the teachings herein, and any of the above differentiable radiance fields may also be created and trained based on the process 400.

The images captured and extracted at the operation 420 may contain various information. The information for each image may include 3D spatial coordinates of the image, and more particularly, 3D spatial coordinates of pixels within the image. The information for each image may also include a viewing direction of an image capture device at the time that the image capture device captured the image. The 3D spatial coordinates and the viewing direction may be input into the neural network to create the NeRF, which may produce an output set of densities and colors (e.g., R, G, B), and rendering volumes of the environment to create the 3D reconstruction.

Conventional differentiable radiance field creation may require significant time to train and render the 3D reconstruction, especially for complex and/or large scenes. Additionally, conventional differentiable radiance field creation may also be inflexible, as the model used to create the differentiable radiance field may be unable to adapt to other scenes or objects. That is, the conventional differentiable radiance field may be created for one specific scene or objection. However, the process 400 may overcome at least some of these challenges, as described further below.

Turning back to the process 400, once the images have been extracted at the operation 420, the images may be filtered at operation 430. Filtering at the operation 430 is discussed in further detail with respect to FIG. 5. Differentiable radiance field may typically require images to be substantially standardized (e.g., taken by the same image capture device, captured within a single video file, etc.). When image files do not meet standardization requirements, conventional differentiable radiance field creation may generate an inaccurate 3D reconstruction of the scene or object. To overcome such issues, the operation 430 may be configured to filter out images that do not meet one or more standards. For example, the operation 430 may filter out noisy images, duplicate images, blurry images, etc., that may negatively impact the accuracy of the 3D reconstruction of the scene or object.

Once the filtering is complete at the operation 430, the process 400 proceeds with calibration at operation 440. As discussed above, each image file may contain or may be associated with various information, such as 3D spatial coordinates and viewing directions, that may be used to train and create the differentiable radiance field. Such information for each image may include intrinsic and extrinsic parameters for each image that are associated with the one or more image capture devices used to capture the respective images. Intrinsic parameters of the one or more image capture devices for each image may include parameters such as focal length, aperture size, field-of-view, resolution, and other camera specification parameters associated with the structure or configuration of the image capture device. Extrinsic parameters may include spatial location coordinates and a viewing direction associated with each of the images captured. As such, at the operation 440, the intrinsic parameters and the extrinsic parameters of the one or more image capture devices that are associated with each of the captured images may be determined.

The intrinsic parameters and the extrinsic parameters determined at the operation 440 may be initially provided (e.g., after extraction and/or filtering) in according to a variety of models, such as CAHVOR, a pinhole camera model, or other models commonly used in computer vision and photogrammetry. Fur purposes of creating the differentiable radiance field, the intrinsic parameters and the extrinsic parameters may be expressed, or modified to be expressed, in a single model. For illustration purposes, the single model can be the pinhole camera model, which can be represented via the camera projection matrix as:

$$P = KR[I{-}t]$$

where R is a 3×3 rotation matrix corresponding to 3D rotation of the image capture device (i.e., an extrinsic parameter), I is a 3×3 identity matrix, t is a 3×1 translation vector corresponding to translation of the image capture device (e.g., an extrinsic parameter), and Kis the camera calibration matrix defined as:

$$K = \begin{pmatrix} f_x & 0 & c_x \\ 0 & f_y & c_y \\ 0 & 0 & 1 \end{pmatrix}$$

The calibration matrix K contains the intrinsic parameters where $f_x$ and $f_y$ are the focal lengths of the camera, and $c_x$ and $c_y$ are the offsets of the principal point from the top-left corner of the image captured. The above pinhole camera model may be used to express the intrinsic and extrinsic parameters for each captured image. As stated above, the pinhole camera model (e.g., the single model) may be the initial expression model of the images captured or the intrinsic parameters and the extrinsic parameters may be converted into the pinhole camera model to create the differentiable radiance field. Any technique may be used for conversion, such as readily available conversion applications for conversion from CAHVOR to the pinhole camera model or other algorithms executed in the operation 440. Additionally, if the intrinsic parameters and/or the extrinsic parameters are not readily provided with the images (e.g., provided as data associated with the images), one or more algorithms may be employed to obtain that intrinsic parameters and/or the extrinsic parameters, such as, for example, a Structure from Motion (SfM) algorithm. In any case, the conversion into the pinhole camera model may be completed using the available parameters for each of the images captured. It should also be noted that conversion into pinhole camera model may not be necessary if the intrinsic parameters and the extrinsic parameters are initially provided in the pinhole camera model.

Once the images have been calibrated at the operation 440, and more specifically, once the intrinsic and extrinsic parameters have been calibrated, differentiable radiance field creation may begin at operation 450. For illustrative purposes, the differentiable radiance field created at the operation 450 may be a neural radiance field (NeRF). At the operation 450, the creation of the NeRF may be optimized to ensure that the resultant generated 3D reconstruction accurately reflects the real-world scene or object. The creation of the differentiable radiance field may be based on the images, the intrinsic parameters (e.g., the calibrated intrinsic parameters), and the extrinsic parameters (e.g., the calibrated extrinsic parameters). To optimize the differentiable radiance field created, one or more hyper-parameters of the differentiable radiance field, which may be the parameters used to train the model creating the differentiable radiance field, can be configured, set, or adjusted.

Tuning of the NeRF may be completed by determining the quality of the NeRF being created at operation 460. An initial NeRF may be created at the operation 450 and iterations of the NeRF may be created thereafter by tuning the hyper-parameters of the NeRF and rechecking the quality of each iteration of the NeRF. To quantitatively measure the reconstruction quality at the operation 460, the peak signal-to-noise ratio (PSNR) between the underlying (e.g., real-world) scene and the reconstructed scene using the NeRF may be determined. In the PSNR, the underlying scene image set may be represented by S and the respective synthesized image set (e.g., the images created in the 3D reconstruction) may be represented as S2. For each image (e.g., each image within S is compared to its respective (i.e., corresponding) image in S2), the PSNR may be described by a set of images (e.g., the images captured) represented as:

$$PSNR(I, i) = 10 \cdot \log_{10}\left(\frac{\max(I^2)}{MSE(I, i)}\right)$$

where the mean square error (MSE) is represented as:

$$MSE(I, i) = \frac{(I - i)^2}{W \cdot H \cdot C}$$

To get the PSNR between the set S and the set S2, the average PSNR of all PSNRs of the corresponding images of the sets S and S2 may be determined.

To properly tune the hyper-parameters of the NeRF, a random search method or other methodology may be used. During the tuning, the PSNR (i.e., the average PSNR) determined at the operation 460 may be used in the operation 450 to continue the optimization of the NeRF. For example, the initial NeRF may be created at the operation 450 and an initial quality determination (e.g., PSNR) may be determined at the operation 460. Based on the quality determination (e.g., the PSNR value), one or more hyper-parameters may be identified and adjusted at the operation 450 to optimize the quality of the 3D reconstruction. The hyper-parameters may be identified and adjusted based on one or more techniques, including utilization of a random search method. Iteratively creating the NeRF and determining the PSNR may be performed any desired number of iterations, for a desired computation or clock time, until a convergence criterion is met, or a combination thereof. In an example, the convergence criterion may be that the PSNR meets at least a PSNR threshold.

At operation 480, a view may be synthesized from the trained differentiable radiance field. To synthesize a view, the differentiable radiance field (e.g., a NeRF or Gaussian Splatting) may or may be caused to generate the 3D reconstruction, such as the 3D reconstruction 200 of the environment 100. The 3D reconstruction may include one or more portions of the real-world scene captured in the images and one or more novel portions of the real-world scene that are synthesized in the 3D reconstruction and were not captured in the images used to create the differentiable radiance field. As a result, the resultant 3D reconstruction may provide a complete and accurate representation of the real-world scene in its entirety without requiring all portions of the scene to be captured in the images used when creating the differentiable radiance field.

The 3D reconstruction, including synthesizing novel portions of the scene, may be provided to the user 202 via any device, such as the computing device 308 or any other interaction device. The 3D reconstruction may be scaled and visually provided to the user 202 for further review and analysis, thereby providing the user 202 a means to visually survey a representation of the real-world scene without physically visiting the real-world scene. For example, the 3D reconstruction may be provided to the user 202 via a drone or a projector. Alternatively, the 3D reconstruction may be provided using smart glasses, in which the user 202 may look through the glasses into an augmented or virtual reality that contains the 3D reconstruction.

To further optimize the 3D reconstruction process, the differentiable radiance fieldmodel may be modified to create the differentiable radiance fieldusing more efficient versions of the images. For example, a conventional differentiable radiance field may typically be created (trained) based upon a sparse set of images and their associated data. As a result, the learning process of the differentiable radiance field model may take a substantial amount of time, thereby rendering the differentiable radiance field creation prohibitive for larger scale or complex scenes. To significantly improve the time to create the differentiable radiance field based on the process 400, the sparse set of images captured may be replaced with instant neural graphics primitives (instant NGPs). The NGPs for each image may be a set of fixed-length vectors that may be learned (e.g., using the differentiable radiance field model or a separate model in communication with the differentiable radiance field model) to preserve the information of the original images in a (typically) significantly more compact representation (e.g., files of smaller sizes than the original). As a result, the learning process of the differentiable radiance field model and creation of the differentiable radiance field may take substantially reduced time. As is known, NGPs are a class of machine learning models that are used to represent and render 3D scenes. NGPs are parameterized by neural networks, which are trained on data such as images, point clouds, or meshes.

After the operation 450 for optimization and/or after the operation 460 for quality determination, an uncertainty determination may be completed at operation 470. The operation 470 may be completed before, during, or in conjunction with the 3D reconstruction and synthesizing done at the operation 480. The uncertainty determination may be used to account for fluctuations during training and creation of the differentiable radiance field. The uncertainty determination at the operation 470 may also compute (e.g., using the computing device 308) and provide a confidence in association with the generated and synthesized 3D reconstruction. The confidence may be or may be represented as an uncertainty map of the 3D reconstruction. Such uncertainty may be determined with respect to synthesized portions of the 3D reconstruction. For example, for each novel (synthesized) portion of the 3D reconstruction, the uncertainty may be determined and provided to the user 202 to indicate the probability (e.g., degree) of match of the novel portion to the real-world scene. As such, the user 202 may be informed of uncertainties (and degrees thereof) in the model so that the user can avoid pitfalls due to inaccuracies in the 3D reconstruction.

If the 3D reconstruction is a simulated environment of a real-world scene, the uncertainty map may provide support to a navigation team of the real-world environment to determine the best sequencing and/or navigation plan, while taking into account any potential pitfalls of the synthesized portions of the 3D reconstruction being inaccurate. As such, the uncertainty map may be a visual representation of geometric and texture uncertainties with respect to the one or more novel portions of the scene (e.g., the environment).

The uncertainty at the operation 470 may be determined using a variety of techniques or algorithms, such as a statistical method. By way of example, using a bootstrap method, once the hyper-parameters of the differentiable radiance field model have been optimized at the operation 450, the training process used in the operation 450 to achieve the optimized hyper-parameters may be repeated a desired number of times. The synthesized views created in the repeated 3D reconstructions for a specific portion of the reconstruction may then be compared to one another to determine variation between the synthesized views. For example, the synthesized views produced into a multi-set of bootstrapped images, which may then be digitally stacked or otherwise compared to determine deviation from an expected rendering result and/or deviation between the synthesized views. The uncertainty map may then be generated and provided with the 3D reconstruction to the user 202.

Figure 5:
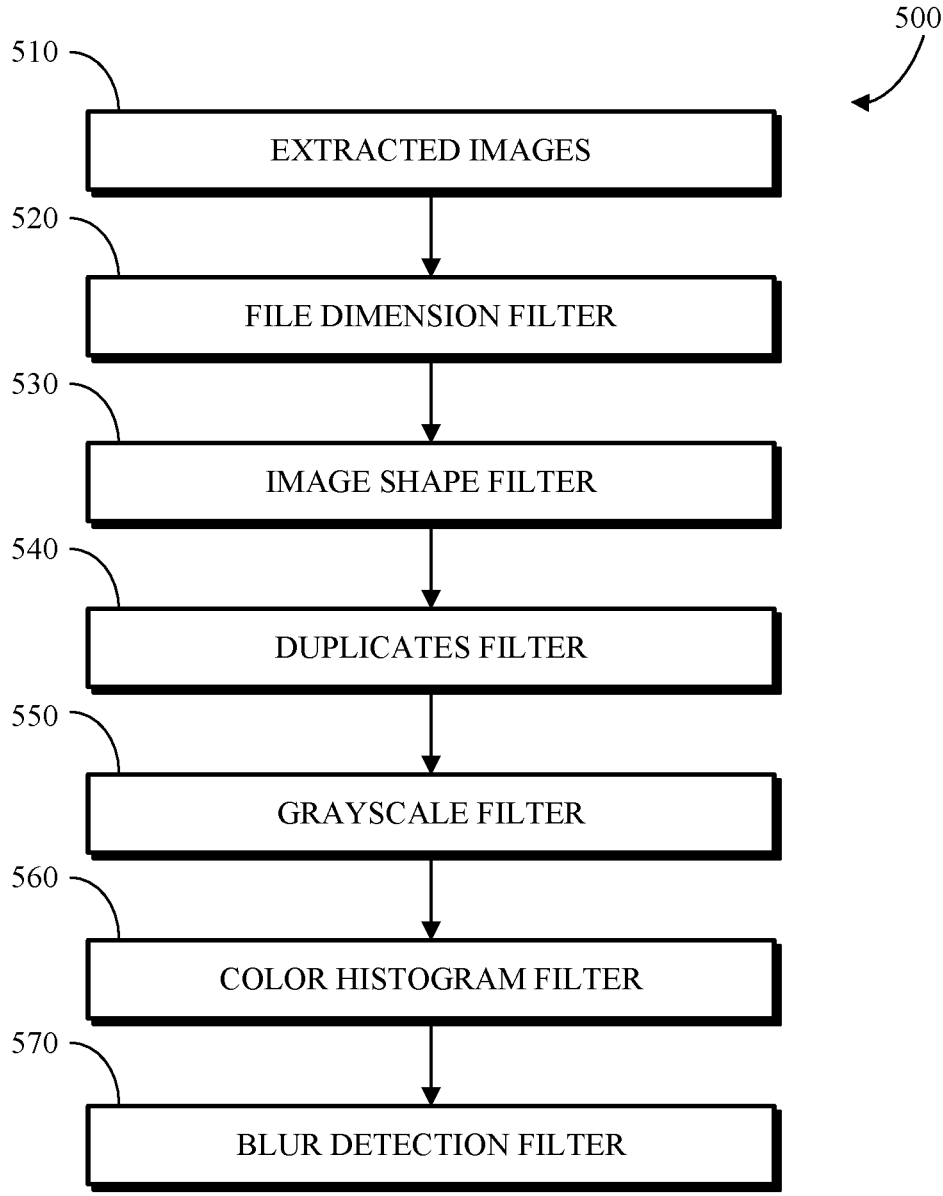
FIG. 5 is a flowchart of an example of the filtering operation of the process illustrated in FIG. 4.

FIG. 5 illustrates a flowchart of an example of a filtering process 500, which may be completed at the operation 430 of FIG. 4. Prior to filtering, the images may be extracted (or otherwise received in any number of ways) at operation 510. Extracting the images may be as described with respect to the operation 420 of FIG. 4. Once the images have been extracted, the images may be processed via one or more filtering operations. For brevity, an image may be said to go through one or more filters. The filtering process 500 may include one or more filtering operations. In an example, the filtering operations may include one or more of a file dimension filter 520, an image shape filter 530, a duplicates filter 540, a grayscale filter 550, a color histogram filter 560, and a blur detection filter 570. However, additional or fewer filters may be included in the filtering process 500. One or more of the filters (i.e., filtering operations) may be performed simultaneously or in any desired order.

With respect to the file dimension filter 520 and the image shape filter 530, the images may be filtered based on their file size and their image shape, respectively. Such filtering may be parameterized using one or more threshold values. For example, if an image has a file size less than a threshold value or the image is too small dimensionally, the image may be removed and filtered out (i.e., is unused) when generating the NeRF.

The duplicates filter 540 may utilize a perceptual hash function to identify images with near-identical hashes and remove such duplicate images in which the portion of the environment captured may be the same regardless of the color filters used to capture the portion of the environment.

The grayscale filter 550 may be used to identify any images with only one color channel and filter such images out when creating the NeRF. However, some grayscale images may contain all three color channels (e.g., a color image that contains the same values for all three color channels (i.e., RGB) in every pixel such that the color image visually appears as a grayscale image). In such a case, these images may still be identified at or by the grayscale filter 550 for each pixel in the images, since their RGB values will be equal.

The color histogram filter 560 may analyze the images that have passed through the aforementioned filters and build a histogram of the average color intensities for the images. After building the histogram, an image may be filtered out if more than a threshold (e.g., half) of the count of saturation values of that particular image are more than a predefined metric (e.g., a standard deviation) away from the average saturation value. Such filtering may be beneficial for images of an environment that have generally consistent color channel values throughout the environment while images that do not contain the environment (e.g., foreign objects within the environment) may have significantly different color channel values. For example a land mass or planet surface may generally have consistent color channel values for images captured whereas foreign object (e.g., a vehicle) located on the land mass or planet surface may have different color channel values such that the foreign object may have a substantially different color histogram. As a result, if desired, images of the foreign object may be filtered.

The blur detection filter 570 may calculate the variance of the Laplacian of the image, which can be used to detect significant and/or rapid intensity changes within the image. Such a filter may determine the sharpness of an image based upon a threshold value established. As a result, blurry photos that do not meet the sharpness threshold value may be filtered out (i.e., are unused in the training of the NeRF).

Once the filtering process 500 is completed, the remaining images may be calibrated at operation 440 of FIG. 4.

Figure 6:
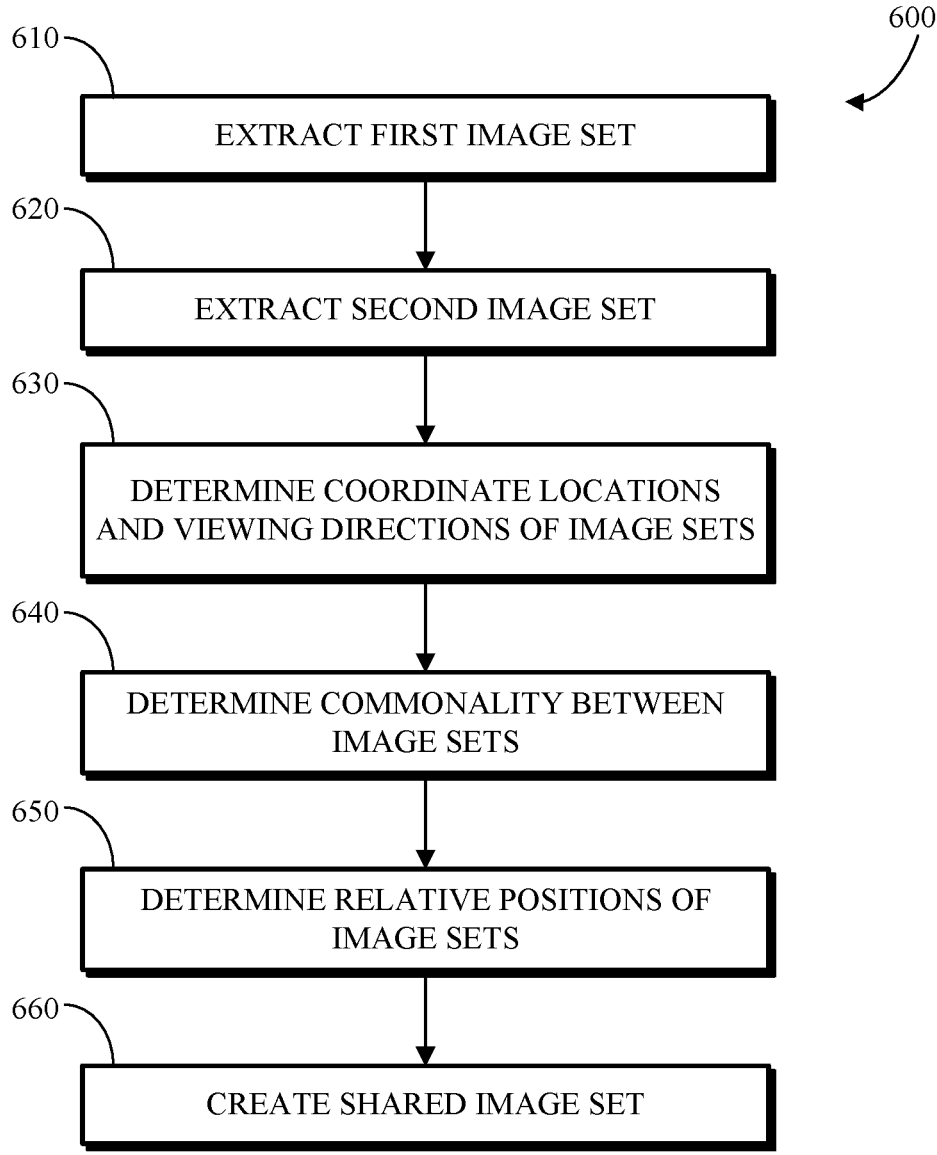
FIG. 6 is a flowchart of an example of a process for commonizing images to generate a differentiable radiance field.

FIG. 6 illustrates a flowchart of an example of a process 600 for commonizing images together to generate the NeRF. As discussed above, the images of the environment, such as the environment 100, may be captured by one or more image capture devices. For example, the images may be captured by a first image capture device and a second image capture device. The first image capture device and the second image capture device may have one or more different intrinsic parameters, one or more different extrinsic parameters, or both. While a conventional NeRF model may be unable to use such varying images, the process 600 may be used to commonize such varied images together for generating a NeRF model according to the process 400 described above.

The first image capture device may capture images that are contained or otherwise stored in a first image set and the second image capture device may capture images that are contained or otherwise stored in a second image set. At operation 610, the first image set may be extracted. Similarly, at operation 620, the second image set may be extracted. The operations 610, 620 may be completed sequentially or simultaneously. Extracting the images at the operations 610, 620 may be similar to the operation 420 of FIG. 4.

Once the first image set and the second have been extracted, the coordinate locations and the viewing directions for each image capture device may be determined at operation 630. That is, for each image in the first image set, the coordinate location and the viewing direction of the first image capture device may be determined. Similarly, for each image in the second image set, the coordinate location and the viewing direction of the second image capture device may be determined. The coordinate locations and the viewing directions may be determined as described above using the intrinsic parameters and the extrinsic parameters of the image capture devices (e.g., as described above with respect to the operation 440 of FIG. 4).

After the coordinate locations and viewing directions of the image capture device for each image within the first image set and the second image set has been determined at the operation 630, commonality between the first image set and the second image set may be completed at operation 640. To determine commonality, one or more techniques or processes may be executed to compare the respective coordinate locations and the respective viewing directions of the first image set and the second image to find a common surface, texture, or feature common to at least one image from the first image set and at least one image from the second image set.

Once the commonality between the first image set and the second image set has been identified at the operation 640, relative positions of the first image capture device and the second image capture device may be determined at operation 650. That is, since a common surface, texture, or feature has been identified between an image of the first image and an image of the second data set, the intrinsic parameters, and the extrinsic parameters of the image capture devices for such images may then be compared to determine the relative positions of the image capture devices.

For example, a first image from the first image set may have associated therewith intrinsic parameters and extrinsic parameters of the first image capture device, and a second image from the second image set may have associated therewith intrinsic parameters and extrinsic parameters of the second image capture device. Additionally, the first image and the second image may share an identified commonality, such as a common surface, texture, or feature captured in both the first image and the second image, albeit with different distortion levels or camera points-of-view, lighting conditions, perspectives, or the like. As a result, the intrinsic parameters and the extrinsic parameters associated with the first image (e.g., identifying a location and viewpoint of the fi'st i'age capture device) may be compared to the intrinsic parameters and the extrinsic parameters associated with the second image (e.g., identifying a location and viewpoint of the second image capture device) to determine the position of the first image capture device with respect to the second image capture device, or vice versa.

Thus, the location of the first image capture device for all images in the first image set may be determined relative to the location of the second image capture device for all images in the second image set. Based on determining the relative location of the first image capture device to the second image capture device, the images in the first image set and the images in the second image set may be commonized such that all the images (e.g., the images of the first image set and the images of the second image set) may be converted to have one or more shared (e.g., common) extrinsic parameters. The images of the first image set and the images of the second image set may be converted to share a common coordinate system such that the locations of the first image capture device and the second image capture device are located in the same coordinate system. Similarly, the viewing directions of the first image capture device and the second image capture device may also be expressed with respect to the common coordinate system. For example, projection operations may be performed on images of the first image set to convert them to images that are based on the location of the second image capture device or coordinate system determined for the second set of images.

As a result of converting one or more extrinsic parameters of the first image capture device and the second image capture device, the first image set and the second image set may be commonized to create a shared image set at operation 660, in which all images from the first image set and the second image set may be utilized to create the NeRF according to the process 400.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of" Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to $180° \pm 25\%$ (e.g., an angle that lies within the range of (approximately) $135°$ to (approximately) $225°$). The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A method comprising:
obtaining images of an environment that are captured by one or more image capture devices, wherein at least one of intrinsic parameters or extrinsic parameters is different between the two or more image capture devices;
determining the intrinsic parameters and the extrinsic parameters of the one or more image capture devices that are associated with each of the images, wherein the extrinsic parameters include spatial location coordinates and a viewing direction with respect to a reference image;
determining neural graphics primitives of the environment based upon the images of the environment, wherein the neural graphics primitives comprise learned representations containing information about geometric and appearance features of the environment extracted from the images using a neural network trained to optimize an underlying continuous three-dimensional representation function using a sparse set of input views of the environment;
creating a differentiable radiance field associated with the environment based upon the intrinsic parameters, the extrinsic parameters, and the neural graphics primitives,
wherein the differentiable radiance field is a neural representation that models three-dimensional scene properties of the environment, including color and density, as continuous functions optimized via differentiable optimization training to enable rendering from novel viewpoints;
generating, based upon the differentiable radiance field, a three-dimensional representation of the environment, wherein the three-dimensional representation contains one or more portions of the environment not captured in the images; and
generating additional synthetic images from the differentiable radiance field to augment a training set of the neural network for enabling the neural graphics primitives to be trained on additional viewpoints and reducing reconstruction inaccuracies caused by unrepresented regions.

2. The method of claim 1, further comprising:
prior to determining the intrinsic parameters and the extrinsic parameters of the one or more image capture devices, filtering the images based on one or more filters to create a filtered image set, wherein the one or more filters includes at least one of the following filters: a file dimension filter, an image shape filter, a duplicate image filter, a grayscale filter, a color histogram filter, or a blur detection filter; and
filtering the images based on one or more filters using threshold values to create a filtered image set, wherein the filtering improves accuracy of intrinsic and extrinsic parameter determination and quality of the three-dimensional representation.

3. The method of claim 1, wherein the one or more image capture devices comprises a first image capture device and a second image capture device, further comprising:
determining a shared reference image between at least one image captured by the first image capture device and at least one image captured by the second image capture device;
based upon the determined reference image, determining a relative position of the first image capture device and the second image capture device with respect to the shared reference image; and
combining the images from the first and second image capture devices to create a shared image set using the determined relative position; wherein the differentiable radiance field is created based on the shared image set.

4. The method of claim 1, wherein the extrinsic parameters include spatial location coordinates and a viewing direction of the one or more image capture devices associated with each of the images.

5. The method of claim 1, wherein the images of the environment captured by the one or more image capture devices are two-dimensional images.

6. The method of claim 5, wherein the images of the environment are captured by two or more image capture devices, and at least one of the intrinsic parameters or the extrinsic parameters is different between the two or more image capture devices.

7. The method of claim 1, wherein the intrinsic parameters and the extrinsic parameters are initially represented by a CAHVOR model or a pinhole camera model for each of the images.

8. The method of claim 7, wherein the intrinsic parameters and the extrinsic parameters are initially represented by the CAHVOR model, and wherein the method further comprises:
prior to creating the differentiable radiance field, converting the representation of the intrinsic parameters and the extrinsic parameters from the CAHVOR model to the pinhole camera model.

9. The method of claim 1, further comprising:
determining a quality of the three-dimensional representation compared to the environment; and
based on the quality determined, adjusting one or more hyper-parameters of the neural network that creates the differentiable radiance field.

10. The method of claim 9, wherein the quality is determined by determining a peak signal-to-noise ratio between the environment and the three-dimensional representation.

11. The method of claim 1, further comprising:
determining an uncertainty of the three-dimensional representation with respect to the one or more portions of the environment not captured in the images; and
generating, based upon the determined uncertainty, an uncertainty map.

12. The method of claim 11, wherein the uncertainty map is a visual representation of geometric and texture uncertainties with respect to the one or more portions of the environment not captured or under represented in the images.

13. The method of claim 11, wherein the uncertainty map is generated based on a statistical method and the differentiable radiance field is an optimized neural radiance field (NeRF) or a 3D Gaussian splatting.

14. A device, comprising:

a non-transitory memory; and a processor configured to execute instructions stored in the non-transitory memory to:

obtain images of an environment that are captured by one or more image capture devices, wherein at least one of intrinsic parameters or extrinsic parameters is different between the two or more image capture devices;

determine the intrinsic parameters and the extrinsic parameters of the one or more image capture devices that are associated with each of the images, wherein the extrinsic parameters include spatial location coordinates and a viewing direction with respect to a reference image;

determine neural graphics primitives of the environment based upon the images of the environment, wherein the neural graphics primitives comprise learned representations containing information about geometric and appearance features of the environment extracted from the images using a neural network trained to optimize an underlying continuous three-dimensional representation function using a sparse set of input views of the environment;

create, a differentiable radiance field associated with the environment based upon the intrinsic parameters, the extrinsic parameters, and the neural graphics primitives, wherein the differentiable radiance field is a neural representation that models three-dimensional scene properties of the environment, including color and density, as continuous functions optimized via differentiable optimization training to enable rendering from novel viewpoints; and generate, based upon the differentiable radiance field, a three-dimensional representation of the environment, wherein the three-dimensional representation contains one or more portions of the environment not captured in the images.

15. The device of claim 14, wherein the images of the environment are captured by a first image capture device and a second image capture device, and at least one of the intrinsic parameters or the extrinsic parameters is different between the first image capture device and the second image capture device.

16. The device of claim 15, wherein the images include: a first image set that contains images of the environment captured by the first image capture device, and a second image set that contains images of the environment captured by the second image capture device, and wherein the instructions further include instructions to:

determine a commonality between at least one of the images of the first image set and at least one of the images of the second image set; and based upon the commonality determined, determine a relative position of the first image capture device with respect to the second image capture device for each of the images of the first image set and the second image set.

17. The device of claim 16, wherein after determining the relative position of the first image capture device with respect to the second image capture device for each of the images of the first image set and the second image set, the instructions further include instructions to:

combine the first image set together with the second image set to create a shared image set using the relative position determined, wherein the three-dimensional representation of the environment is created based upon the shared image set.

18. A non-transitory computer-readable medium that stores computer-executable instructions that, when executed by a processor, perform operations comprising:

obtaining images of an environment that are captured by one or more image capture devices, wherein at least one of intrinsic parameters or extrinsic parameters is different between the two or more image capture devices;

determining the intrinsic parameters and the extrinsic parameters of the one or more image capture devices that are associated with each of the images, wherein the extrinsic parameters include spatial location coordinates and a viewing direction with respect to a reference image;

determining neural graphics primitives of the environment based upon the images of the environment, wherein the neural graphics primitives comprise learned representations containing information about geometric and appearance features of the environment extracted from the images using a neural network trained to optimize an underlying continuous three-dimensional representation function using a sparse set of input views of the environment;

creating a differentiable radiance field associated with the environment based upon the intrinsic parameters, the extrinsic parameters, and the neural graphics primitives, wherein the differentiable radiance field is a neural representation that models three-dimensional scene properties of the environment, including color and density, as continuous functions optimized via differentiable optimization training to enable rendering from novel viewpoints; and generating, based upon the differentiable radiance field, a three-dimensional representation of the environment, wherein the three-dimensional representation contains one or more portions of the environment not captured in the images.

19. The non-transitory computer-readable medium of claim 18, wherein the device is one of a personal device or a cloud computer, and the computer-executable instructions are included in a downloadable software application.

20. The non-transitory computer-readable medium of claim 19, wherein the downloadable software application is executable to implement at least one of a simulation procedure, a learning procedure, a machine learning procedure, or a differentiable procedure.

* * * * *